(12) United States Patent
Forrester et al.

(10) Patent No.: US 7,574,218 B2
(45) Date of Patent: Aug. 11, 2009

(54) SYSTEMS AND METHODS FOR TRANSMITTING GLOBAL POSITIONING SYSTEM INFORMATION

(75) Inventors: Tim Forrester, San Diego, CA (US); Doug Dunn, Chula Vista, CA (US); Henry Chang, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 46 days.

(21) Appl. No.: 10/830,371

(22) Filed: Apr. 22, 2004

(65) Prior Publication Data

US 2004/0198449 A1 Oct. 7, 2004

Related U.S. Application Data

(63) Continuation-in-part of application No. 10/051,517, filed on Jan. 16, 2002, now Pat. No. 7,398,094.

(51) Int. Cl.
G01C 21/26 (2006.01)
(52) U.S. Cl. ............ 455/456.1; 455/404.2; 342/357.01; 342/357.06; 342/357.12; 342/357.15
(58) Field of Classification Search .............. 455/456.5, 455/456.2, 456.1, 422, 414.3, 456.3, 503, 455/561, 3.02, 3.03, 3.06, 67.11, 403, 461, 455/404.2; 342/357.06, 357.1, 352, 357.01, 342/357.09, 357.12, 357.15; 701/214, 213, 701/215
See application file for complete search history.

(56) References Cited

U.S. PATENT DOCUMENTS

| | | | |
|---|---|---|---|
| 5,801,659 A * | 9/1998 | Helfrick | 342/357.08 |
| 6,097,974 A | 8/2000 | Camp, Jr. | |
| 6,134,483 A * | 10/2000 | Vayanos et al. | 701/13 |
| 6,212,475 B1 * | 4/2001 | France et al. | 701/214 |
| 6,295,023 B1 * | 9/2001 | Bloebaum | 342/357.06 |
| 6,346,911 B1 * | 2/2002 | King | 342/357.06 |
| 6,411,811 B2 * | 6/2002 | Kingdon et al. | 455/456.5 |
| 6,429,811 B1 * | 8/2002 | Zhao et al. | 342/357.09 |
| 6,525,689 B2 * | 2/2003 | Dooley et al. | 342/357.09 |
| 6,535,815 B2 * | 3/2003 | Bloebaum | 701/213 |
| 6,633,765 B1 * | 10/2003 | Maggenti | 455/503 |
| 6,677,894 B2 * | 1/2004 | Sheynblat et al. | 342/357.1 |
| 6,760,582 B2 * | 7/2004 | Gaal | 455/423 |
| 6,861,980 B1 * | 3/2005 | Rowitch et al. | 342/357.06 |
| 6,895,249 B2 * | 5/2005 | Gaal | 455/456.1 |
| 7,009,948 B1 * | 3/2006 | Carlsson et al. | 370/329 |
| 2001/0044312 A1 * | 11/2001 | Yamane | 455/456 |
| 2002/0111171 A1 * | 8/2002 | Boesch et al. | 455/456 |
| 2002/0123352 A1 * | 9/2002 | Vayanos et al. | 455/456 |
| 2002/0135510 A1 * | 9/2002 | Bruno et al. | 342/357.1 |
| 2002/0164998 A1 * | 11/2002 | Younis | 455/456 |
| 2003/0011513 A1 * | 1/2003 | Zhao et al. | 342/357.09 |
| 2003/0125046 A1 * | 7/2003 | Riley et al. | 455/456 |
| 2003/0143949 A1 * | 7/2003 | Karabinis | 455/12.1 |
| 2004/0132516 A1 * | 7/2004 | Usui | 455/575.7 |

* cited by examiner

Primary Examiner—CongVan Tran

(57) ABSTRACT

A wireless communication system includes a location assist system that is configured to interface with a network, such as the Internet, or a server, such as an HTTP server, to obtain GPS information. The GPS information can then be used to provide wireless devices within the wireless communication system with GPS assistance information that allows the wireless devices to quickly and efficiently acquire GPS satellites signals.

2 Claims, 7 Drawing Sheets

SYSTEMS AND METHODS FOR TRANSMITTING GLOBAL POSITIONING SYSTEM INFORMATION

RELATED APPLICATION INFORMATION

This application claims priority as a Continuation-In-Part to U.S. patent application Ser. No. 10/051,517, entitled, "Systems and methods for Transmitting Global Positioning System Information from a Wireless Communication System Base Station" filed on Jan. 16, 2002, now U.S. Pat. No. 7,398,094 which is incorporated herein by reference as if set forth in full.

BACKGROUND OF THE INVENTION

1. Field of the Invention

The invention relates generally to global positioning using the Global Positioning System (GPS) and more particularly to systems and methods for obtaining global positioning satellite information.

2. Background

A traditional GPS receiver receives and processes specially coded satellite communication signals. The satellite signals are generated from an array of satellites that comprise the GPS system. Nominally, this array consists of 24 satellites arranged in various orbits such that between 5 and 8 satellites are visible from any point on earth. GPS receivers convert the satellite signals into position, velocity, and time estimates. Four satellites are required to compute the three position dimensions (x,y,z) as well as the time.

More and more frequently wireless communication devices, such as cellular type handsets, are incorporating GPS capability. A driving factor behind the integration of GPS into wireless communication devices is the Federal Communication Commission's (FCC's) Enhanced 911 (E911) mandate. The purpose of the FCC's E911 rules is to improve the reliability of wireless 911 service and to provide emergency service personnel with location information that will enable them to provide emergency service faster and more efficiently. Wireless communication system operators are required to provide Automatic Location Identification (ALI) as part of phase II of the E911 implementation. Incorporating GPS within wireless communication devices enables wireless communication system operators to meet the phase II requirements.

Incorporation of GPS can, however, prove taxing on the limited resources of most wireless communication devices. Size, cost, memory, and processing power are all limited resources within a wireless communication device. In order to reduce the impact of incorporating GPS capability on such resources, the wireless communication devices' GPS capability is often "network assisted." In other words, the network portion of the wireless communication system provides information, such as acquisition assist (AA) or sensitivity assist (SA) information, that allows a wireless communication device to acquire, quickly and effectively, the GPS satellites needed to provide the requisite location information.

In a large-scale emergency, however, the network assist resources are likely to become inundated due to thousands of 911 calls. Such inundation is likely to cripple the positioning capabilities of wireless communication systems, just when they are needed most. Incorporating full GPS capability in wireless communication devices can prevent this problem. But, as mentioned, such an approach is undesirable due to the negative impact it will have on the device's limited resources. Thus, the massive traffic created by a major disaster can cripple the ALI ability of conventional wireless communication systems and the only currently available solution overburdens already limited wireless communication device resources.

SUMMARY OF THE INVENTION

In order to overcome the problems associated with network assisted GPS capability in conventional wireless communication systems, the systems and methods described herein reduce the burden on the network by distributing the position assist capabilities throughout the network. Moreover, the systems and methods described herein allow the wireless communication device to be "primed" with assist information so that they can automatically acquire the requisite GPS satellites upon receiving a position request. Thus, for example, the position assist capability can reside within base stations in the communication system. The base stations can then periodically transmit the position assist information to wireless communication devices within the communication system. The information can be stored in the devices, then when one of the devices receives a position request, it can automatically access the stored information and quickly acquire the appropriate GPS satellites without accessing the network portion of the communication system.

While the systems and methods described herein are particularly advantageous during a large-scale emergency, they also provide advantages during less critical operation. With this in mind, other aspects, advantages, and novel features of the invention will become apparent from the following Detailed Description of Preferred Embodiments, when considered in conjunction with the accompanying drawings.

BRIEF DESCRIPTION OF THE DRAWINGS

Preferred embodiments of the present inventions taught herein are illustrated by way of example, and not by way of limitation, in the figures of the accompanying drawings, in which.

DETAILED DESCRIPTION OF THE PREFERRED EMBODIMENTS

Figure 1:
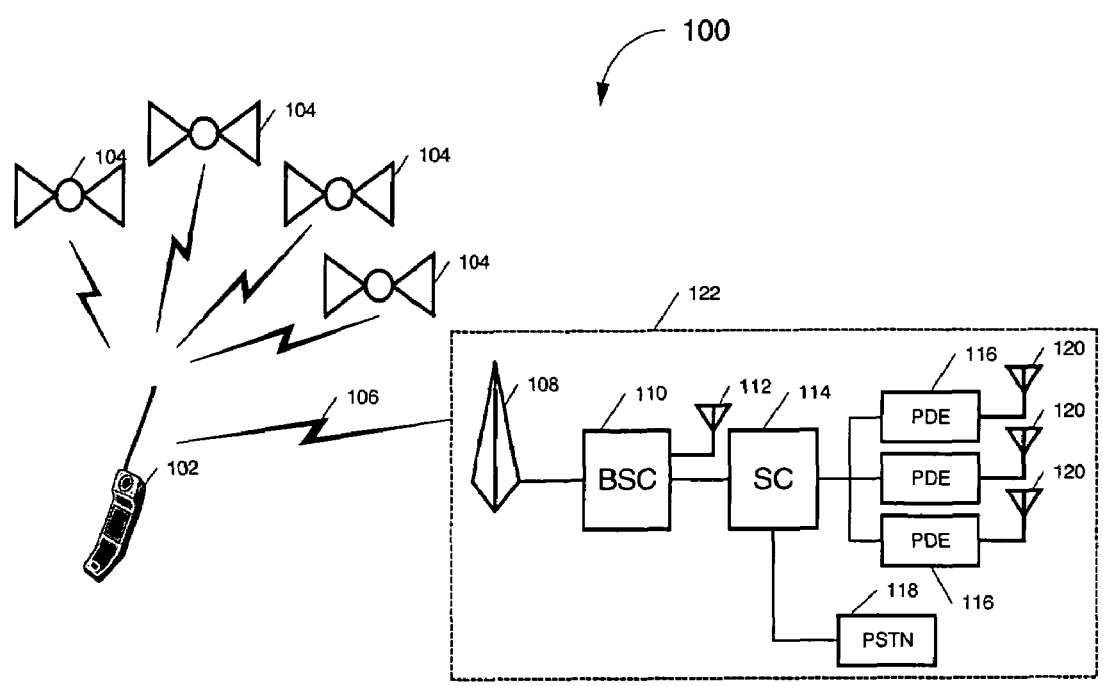
FIG. 1 is a diagram illustrating one example embodiment of a wireless communication system configured in accordance with the invention.

FIG. 1 is a diagram illustrating a "location enabled" wireless communication system 100 in accordance with the systems and methods described herein. In system 100, a plurality of wireless communication devices, of which device 102 is presented as an example, communicate over a wireless communication channel 106 with a plurality of base transceiver stations (BTSs), of which BTS 108 is presented as an example. Each BTS 108 is interfaced with a base station controller (BSC) 110, which in turn is interfaced with a switching center 114. Switching center 114 controls communication between wireless communication devices 102 and between devices 102 and the Public Switched Telephone Network (PSTN) 118. For purposes of this specification and the claims that follow, the term "base station" can, depending on the circumstances, refer to a BTS 108, a BSC 110, or the combination of a BTS 108 and a BSC 110.

While system 100 in general most resembles a Wireless Wide Area Network (W-WAN), it will be apparent that system 100 is presented by way of example only. Thus, it will be understood that the systems and methods described herein are as applicable to W-WANs as they are, for example, to Wireless Local Area Networks (W-LANs), and Wireless Personal Area Networks (W-PANs). Of course, in order for the following description to apply to such systems, the various components of system 100, such as BTS 108, BSC 110, and switching center 114, will need to be replaced by the components associated with the particular system, e.g., a service access point (SAP) in a W-LAN. The systems and methods described herein are not, however, dependent on any particular type of system or any particular system architecture. Further, the systems and methods described herein are applicable regardless of whether system 100 is primarily used for data communication, voice communication, or both, although for purposes of the discussion that follows it will be assumed that system 100 is used primarily for voice communication.

Figure 2:
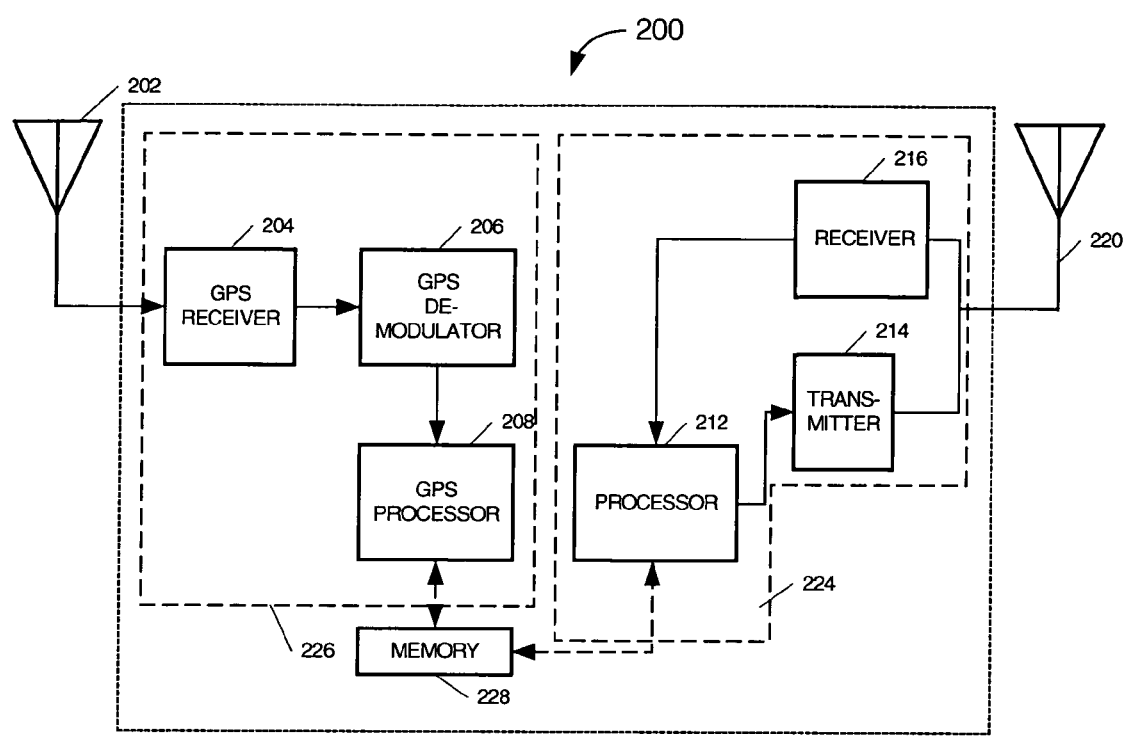
FIG. 2 is a diagram illustrating one example embodiment of a wireless communication device that can be used in the system of FIG. 1 in accordance with the invention.

Device 102 includes a GPS receiver (not shown) so that device 102 can receive position information from GPS satellites 104. It will be assumed that device 102 is a wireless handset; however, device 102 can just as easily be a laptop, or some other type of portable computer, a Personal Digital Assistant (PDA), or some other mobile or fixed electronic device that is enabled both with a GPS receiver and with the appropriate software and hardware to communicate over channel 106. With this in mind, FIG. 2 is a logical block diagram illustrating one example embodiment of a device 200 configured in accordance with the systems and methods described herein. As can be seen, device 200 includes a GPS receiver 226 configured to receive information from GPS satellites 104, and a wireless communication transceiver 224 configured to allow device 200 to communicate over communications channel 106.

Wireless communication transceiver 224 comprises receiver 216, which is configured to receive wireless communication signals from antenna 220. Receiver 216 can also be configured to filter and amplify the received signals and to demodulate the received signals in order to generate baseband information signals. Typically, demodulation comprises two stages: the first stage steps the frequency of a received signal down from a Radio Frequency (RF), used for transmitting signals over channel 106, to an Intermediate Frequency (IF). The IF frequency signal is then stepped down, in the second stage, to baseband. The baseband information signal is then sent to processor 212. Transceiver 224 also includes transmitter 214, which is configured to transmit wireless communication signals via antenna 220 generated by processor 212.

Processor 212 preferably includes various circuits for controlling the operation of handset 200 in general and in particular for controlling communication using transceiver 224. Thus, Processor 212 can include various analog-to-digital (A/D) and digital-to-analog (D/A) converters, processors, Digital Signal Processors (DSPs), Vocoders, and peripheral control circuits as required by a particular device 200. Alternatively, some or all of these circuits can be included in device 200 as stand alone components or as components incorporated into the various components of transceiver 224.

Device 200 also preferably includes memory 228. Memory 228 can be used to store the software instructions used by both GPS receiver 226 and communication transceiver 224 as well as to store position assist information as described below. Thus, memory 228 can comprise a single memory device or a plurality of devices as required by the particular implementation of device 200.

Device 200 also includes GPS processor 208 configured to process GPS signals received via antenna 202. The received signals are preferably filtered and amplified in GPS receiver 204 and demodulated in GPS demodulator 206. Thus, GPS processor 208 can be configured to generate position information when requested without the aid of network portion 128. Accordingly, the implementation illustrated in FIG. 2 can overcome problems associated with network assisted position determination, such as increased traffic and a limited operating range. But, as mentioned, including a full GPS receiver in handset 200 drives up the cost, complexity, and size of device 200 and can also have other negative effects such as reduced battery lifetime.

As such, it can be preferable that network portion 122 of system 100 provide position assist information to device 200. Thus, switching center 114 can be interfaced with one or more Position Determination Entities (PDEs) 116, which include GPS receivers (not shown) for receiving information from GPS satellites 104 via antennas 120. GPS receiver 226 can then be configured to decode satellite signals from satellites 104. The decoded satellite signals can then be sent to a Position Determination Entity (PDE) 116. PDE 116 can then determine the position of device 200 from the decoded satellite signals and this information can be transmitted back to device 200, where it can, for example, be displayed on device 200 via a display (not shown). Alternatively, PDE 116 can, in case of emergency for example, send the information to a Public Safety Answering Point (PSAP).

For example, if the subscriber wants to know his position, he can input a position request into device 200 via a user interface (not shown). Device 200 then acquires satellite signal information from GPS satellites 104 using GPS receiver 226, which decodes the satellite signals. Device 200 transmits the decoded signals to PDE 116 over communication channel 106. PDE 116 generates the position information from the decoded signals and transmits the position to device 200, where it is displayed to the subscriber. Importantly, PDE 116 can also be used to provide device 200 with position assist information, such as AA and SA information, to help device 200 acquire satellites 104. Position assist information, such as AA and SA, will be discussed more fully below.

By incorporating the GPS processing capabilities in PDE 116 instead of device 200, the cost, complexity, and size of device 200 can be reduced while offering enhanced GPS performance due to the greater computational power of the PDE. Since there is constant pressure to reduce the cost, complexity, and size of wireless communication handsets, this networked based approach has distinct advantages. There are, however, important disadvantages. For example, involving network 122 increases the network traffic in system 100, which reduces system capacity, meaning fewer users can use the system. This can be especially problematic during a large-scale emergency when there are thousands of 911 calls, which under the E911 mandate will initiate a position determination for each device 200 as part of the ALI implementation. Thus, while network based position determination is advantageous, the resulting network traffic in system 100 must be reduced within system 100 to avoid over burdening network portion 122 of system 100, in particular PDEs 116.

To this end, BSC 110 in system 100, unlike in conventional systems, can include a GPS receiver (not shown) configured to receive information from satellites 104 via antenna 112. BSC 110 is preferably configured to generate position assist information, such as AA and SA information, from the received information and to periodically transmit the position assist information to device 102. Thus, device 102 is primed with position assist information. If device 102 subsequently receives a position request, it preferably is configured to automatically access the position assist information and to use the information to acquire the appropriate GPS satellites 104 and to determine the position of device 102 from the GPS satellite information. In this manner, network traffic is reduced, as is the burden on PDEs 116.

There are several ways in which position determination can be carried out in accordance with the systems and methods briefly described above. Several exemplary methods are described below in more detail. But first, it should be noted that a position request can be generated for a variety of reasons. As described, a position request can be generated in response to a 911 call as part of the ALI requirement. Alternatively, the user can request his position, which is also described above. But in addition, wireless communication system operators can also provide various services that will push information onto a subscriber's wireless communication device 102 based on their location. Such services require that the subscriber's position be determined. In general, it will be understood that position requests can be initiated in a variety of ways and for a variety of reasons. The above, therefore, are intended to simply serve as examples.

Figure 3:
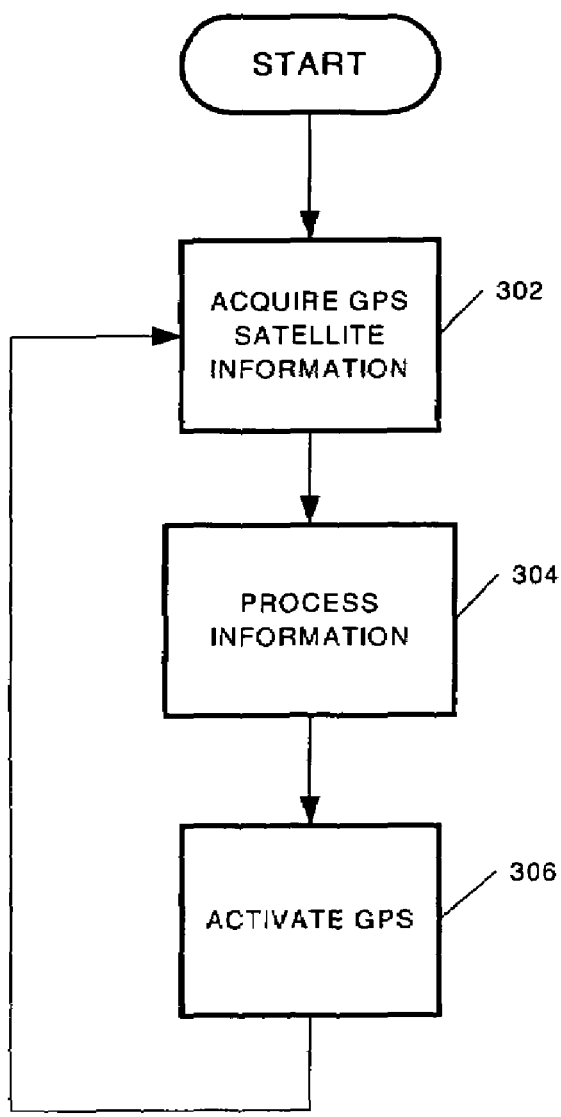
FIG. 3 is a flow chart illustrating one example embodiment of a method for assisted position determination within the system of FIG. 1 in accordance with the invention.

FIG. 3 illustrates one example method whereby the network portion 122 can prime a wireless communication device 102 with position assist information in accordance with one embodiment of the systems and methods described herein. First, in step 302, BSC 110 receives satellite information from GPS satellites 104 using antenna 112 and the associated GPS receiver (not shown). In step 304, BSC 110 preferably processes the received GPS satellite information in order to derive the requisite position assist information, such as AA and SA information. Thus, it is preferable that BSC 110 include the processing hardware and software required to process the received GPS satellite information. Then, in step 306, the processed information is periodically transmitted to device 102.

In a conventional system, PDEs 116 track GPS satellites 104 using an Almanac stored in PDEs 116. The Almanac informs PDEs 116 as to which satellites 104 are visible from different positions on earth at any given time. Thus, in a conventional system, when a device 102 receives a position request, it initiates communication with a PDE 116 to determine which satellites are visible. PDE 116 responds with AA information telling device 102 which satellites 104 to look for as well as SA information, which assists device 102 to acquire satellites 104 when the signals from satellites 104 are excessively attenuated due to interference, such as when device 102 is inside a building.

Normally, a GPS receiver, such as receiver 226, will receive signals with signal levels as low as approximately −130 dBm. But inside a building, for example, the signal levels received by device 200 from satellites 104 can be as low as −150 dBm or lower. The SA information allows device 200 to increase the sensitivity of receiver 226 so that it can receive signals as low as approximately −150 dBm. Thus, the AA and SA information allows device 200 to quickly, preferably in 2 seconds or less, acquire GPS satellites 104 in order to make a position determination.

The main limitation on the sensitivity of GPS receiver 226 is the integration time that receiver 226 uses when receiving signals from satellites 104. In the GPS system, three codes are used to modulate the signals sent by satellites 104. The first is the Coarse Acquisition (CA) code, which is a 1 MHZ pseudo random noise code that repeats every 1023 bits, or every 1 ms. The second is the Precise (P)-code, which is a 10 MHZ code that repeats every 7 days. The third is the navigation message, which is a 50 Hz signal consisting of data bits that describe the orbits, clock corrections, and other parameters related to each satellite 104. It is the CA code that limits the integration time because in addition to repeating every 1 ms, it may also invert every 20 ms depending on system parameters that are unknown to GPS receiver 226. Therefore, receiver 226 can only normally integrate for 1 ms or less, because it never knows if the CA code is going to invert or not.

The SA information, however, lets device 102 know when the CA code is going to invert, which allows receiver 226 to use a longer integration time on the received GPS satellite signals. The longer integration time increases the sensitivity of receiver 226, which in turn allows receiver 226 to work even when the GPS satellite signals are strongly attenuated. Thus, the SA information along with the AA information, which can also include navigation information such as orbits, clock corrections, and other parameters related to each satellite 104, allow device 102 to acquire, quickly and efficiently, satellites 104.

In system 100 traffic within network portion 122 from messages traveling to and from PDEs 116 is reduced because the position assist function typically performed by PDEs 116 is distributed throughout the network. Specifically, in system 100 the position assist function is placed in BSC 110. Thus, BSC 110 can, in one embodiment, act as a standalone PDE. In other words, BSC 110 can include all the requisite information to allow BSC to track all GPS satellites 104 and to acquire and process (step 308) all the required information to assist device 102 with position determination. In an alternative embodiment, PDEs 116 can be used to push information, such as what satellites should be visible, onto BSC 110 so that BSC 110 does not need to store all of the information normally stored on PDEs 116. While this has the advantage of reducing the burden on the resources of BSC 110, it also has distinct disadvantages. In particular, the latter embodiment is not preferred because PDEs 116 can, for example, be crippled due to excessive traffic during a large-scale emergency. Thus, PDEs 116 would not be available to supply information to BSC 110 just when it is required most.

In another alternative embodiment, BSC 110 can comprise full PDE capability, but also be configured to receive GPS information from PDEs 116. Thus, PDEs 116 can be used as a back-up should the BSC's GPS capability be compromised in some fashion.

Distributing the PDE capabilities within the network portion 122 of system 100 reduces traffic within that portion; however, it does not directly address the problem of increased traffic over channel 106 that is due to position determination activity. In order to reduce traffic over communication channels 106, especially during a large-scale emergency, BSC 110 is preferably configured to periodically prime (step 306) device 102 with position assist information. Priming device 102 can be accomplished in several ways. For example, in conventional wireless communication systems, device 102 is required to periodically register with BSC 110. Thus, in one embodiment, BSC 110 can be configured to also transmit updated position assist information to device 102 each time it registers.

Alternatively, BSC 110 can be configured to periodically broadcast the position assist information to all communication devices 102 within range of BTS 108. For example, most wireless communication systems use some type of control channel that includes information that allows communication devices 102 that have recently entered into communication range to acquire and communicate with network 122. Such information is typically periodically broadcast over the control channel, because network 122 does not know when such devices will enter into range. The control channel can, therefore, be used to periodically transmit updated position assist information. In which case, device 102 does not need to register with BSC 110 at all. This can lead to further advantages as described below. Regardless of the method used, however, priming device 102 with position assist information reduces network traffic throughout system 100, including channel over 106.

In another alternative embodiment, BSC 110 can be configured to periodically multicast the position assist information to certain communication devices 102. For example, the operator of network portion 122 can offer certain value added location based services to its subscribers. The position assist information would then be multicast to the communication devices 102 associated with those subscribers that have signed up for one of the value added services. Thus, multicasting can differ from broadcasting in that multicast information can be directed to those communication devices 102 belonging to subscribers who have signed up for, or subscribe, to certain services. In multicasting, the information is transmitted to communication devices 102 wherever they may be in wireless communication system 100. Broadcasting on the other hand involves broadcasting messages to all communication devices 102 within a certain geographic range. Although, it should be noted that a broadcast service can also be subscription based. Thus, communication devices 102 within system 100 can be primed with position assist information received either via broadcast or multicast transmissions.

Figure 4:
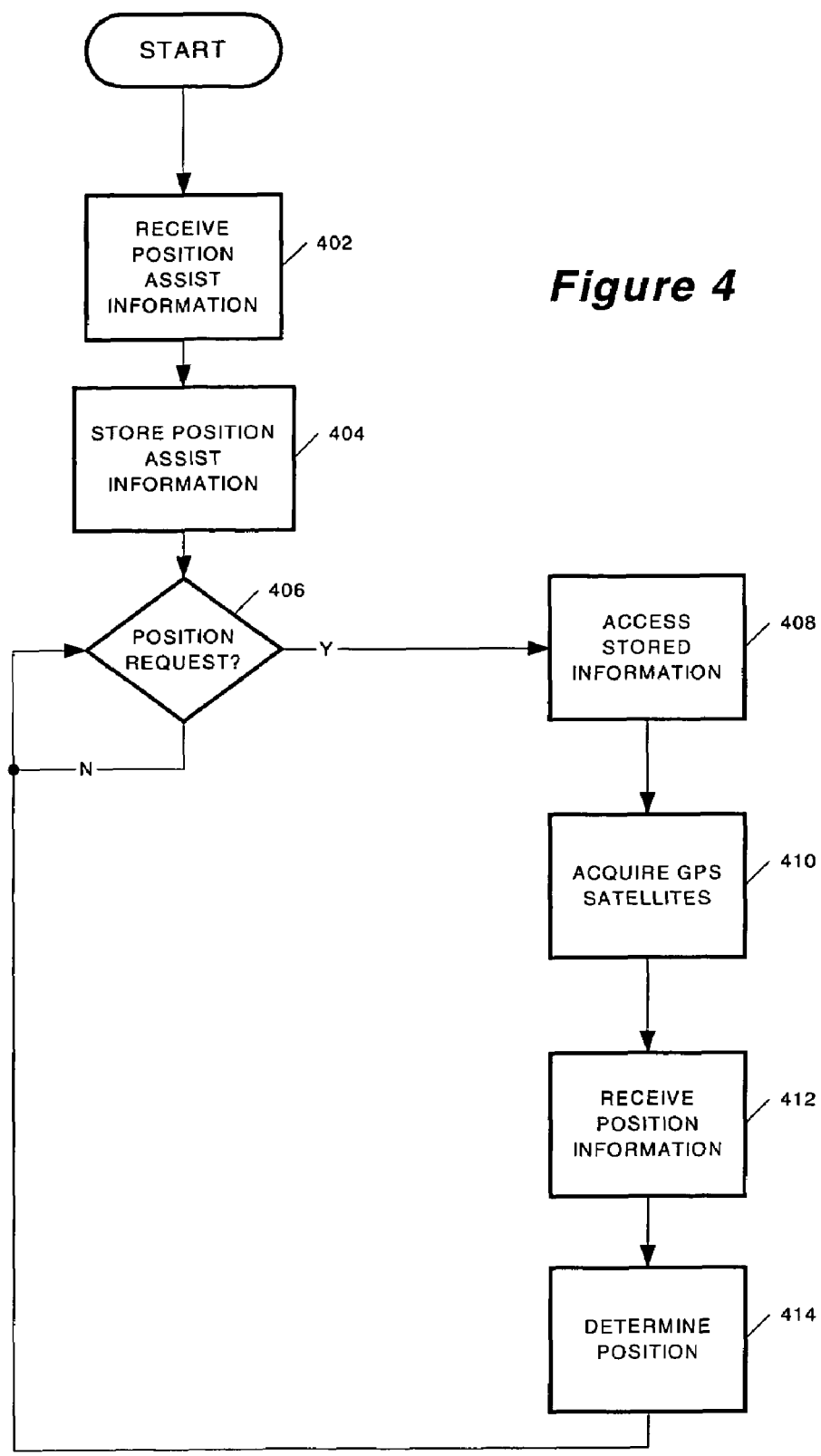
FIG. 4 is a flow chart illustrating a method of assisted position determination performed by the device of FIG. 2 in accordance with the invention.

FIG. 4 is a flow chart illustrating one example process for position determination by a wireless communication device once it is primed with position assist information in accordance with the systems and methods described herein. First, in step 402, the wireless communication device, e.g., device 200, receives the position assist information. Then in step 404, the received information is preferably stored within device 200, e.g., in memory 228. Device 200 then waits in step 406 until a position request is received. Again, a position request is essentially any action that requires the position of device 200 to be determined. If a position request is received in step 406, then in step 408 GPS receiver 226 preferably automatically accesses the position assist information stored in memory 228 and uses it to acquire GPS satellites 104 in step 410. In step 412, device 200 receives GPS signals from satellites 104 and determines the position in step 414 using information encoded in the GPS signals. The process then reverts to step 406 in which device 200 again waits for a position request. Although, in the interim, device 200 may receive (step 402) updated position assist information. Again, it should be noted that in step 412, device 200 can forward information to network portion 122, which can determine the position and send the position back to device 200.

If too much time passes after the assist information is stored in step 404, then the assist information can become stale and need to be updated. Thus, the position request can cause device 200 to assess whether the assist information should be updated based on how long it has been stored. If the information should be updated, then the process can revert to step 402. In alternative embodiments, device 200 does not necessarily need to wait for a position request to update the assist information.

As mentioned previously, if device 200 does not need to register with the network in order to receive the position assist information, then the advantages of the systems and methods described herein can be extended even further. This is because GPS receivers are incorporated into numerous electronic devices, and even into cars, boats, trucks, etc. Any of these "devices" can benefit from the position assist information provided by BSC 110 in the same manner as described above. But these devices typically do not have the capability to communicate with the network portion 122, e.g., over communication channel 106. Therefore, they would not be able to register and then receive the position assist information.

This is not a problem, however, if the devices are not required to register in order to receive the position assist information, e.g., if the information is broadcast, by BSC 110. In this case, any device incorporating a GPS receiver can be configured to periodically receive the position assist information from BSC. 110 and to use it to acquire GPS satellites 104 as described above. It is possible that BSC 110 will include a second transmitter configured to transmit over the same frequency as GPS satellites 104 so that such devices can receive the position assist information using their GPS receivers—although this technique has substantial technical difficulties. Alternatively, these devices can include a second receiver configured to operate at the same frequency used for communication over channel 106 so that they can receive the position assist information broadcast by BSC 110. These devices can suffer from the same resource limitations as wireless communication devices. Therefore, it can be easier to include a second GPS transmitter in BSC 110, since the BSC's resources are not as limited. Further this second GPS transmitter can be used to augment the existing GPS constellation and thus improve accuracy and coverage in an urban environment.

Incorporating a second transmitter into BSC 110 can be problematic depending on the frequency used for communication over channel 106. Fortunately, newer communication systems often use frequencies in the 1 and 2 GHz range, which is close in frequency to that used by GPS satellites 104, i.e., approximately 1.575 GHz. Therefore, incorporating a second transmitter into BSC 110 in order to broadcast position assist information to a variety of devices is feasible in many communication systems. Thus, the advantages described above, i.e., fast satellite acquisition even at low signal levels, can be extended to a variety of devices. This can be advantageous because there are costs associated with including network assisted GPS service into a wireless communication system; however, the wireless communication system operator does not generate any revenue from E911 service. Therefore, the operator must develop other GPS related services to cover the cost of including network assisted GPS capabilities within his system. One way to generate such revenue is to provide network assist information to these other types of GPS devices.

Thus, the position determination capabilities of all types of GPS enabled devices can be enhanced through network assisted positioning in accordance with the systems and methods described herein, which not only leads to enhanced positioning performance, but can also increase revenue for the operators of wireless communication systems. Moreover, the enhanced capabilities will not be negatively impacted during a large-scale emergency, when they are needed most.

For purposes of this specification and the claims that follow, the term "GPS enhanced device" refers to any type of device that includes GPS capabilities as described above; however, the term "GPS device" is used to refer to a device that just includes a GPS receiver, such as GPS receiver 226. In other words, devices that do not include transceiver 224 can be referred to simply as a GPS device.

In addition to position assist information, a communication device 102 can be provided with other GPS assist information. This other GPS assist information can comprise Almanac data, which was referred to above, and/or ephemeris data. A typical GPS receiver makes use of the Almanac data to make range measurements relative to visible GPS satellites. The GPS receiver, after making the measurements, can then use the ephemeris data to calculate and actual position based on the range measurements. A GPS device typically downloads Almanac and ephemeris data directly from the GPS satellites. To download a complete Almanac and ephemeris data for a single satellite can take a minimum of 12.5 minutes.

A communication device 102 can operate—in the same manner, i.e., it can download Almanac and ephemeris data directly from the GPS satellites 104. Alternatively, a communication device 102 can request that the Almanac and ephemeris data be provided from network portion 122. In this case, the data can be transferred much faster. This is because, GPS satellites 104 download the information using a 50 Hz signal, whereas network portion 122 can download the data using much faster data rates, e.g., 9600 bps or higher.

Thus, in the embodiments described above additional GPS assist information, such as Almanac and/or ephemeris data, can be supplied to communication devices 102 along with the position assistant information. Receiving such information from network portion 122, if it is available can be much faster than receiving the information from GPS satellites 104.

All such GPS assist information has a limited time period over which it remains useful. Therefore, it is necessary to periodically refresh the GPS assist information. Almanac data remains useful for several days, and even several weeks. Ephemeris data, on the other hand, is only valid for a few hours, e.g., up to four hours. AA and SA data also has a limited period of usefulness. Generally, however, the period of usefulness for the ephemeris data, as well as the AA and SA data, is long enough that broadcasting the information is a practical way to refresh the information stored in communication devices 102.

In order to reduce the amount of traffic, however, network portion 122 can be configured to transmit the GPS assistance information at regular or irregular intervals. The operator of network portion 122, can have knowledge of the types of devices within system 100 and can, therefore, determine the type of GPS assistance information to be transmitted over communication channel 106. Again, this GPS assist information can be broadcast, or multicast, over a Forward Broadcast Control Channel, or alternatively a Forward Paging Channel, e.g., if the Forward Broadcast Control Channel is not available.

Figure 5:
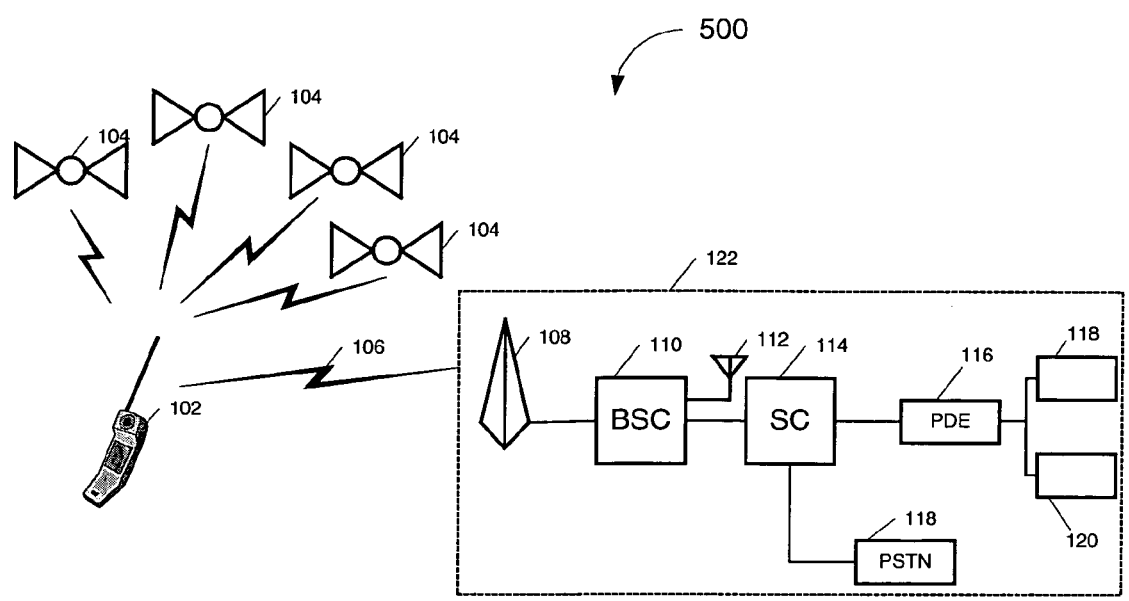
FIG. 5 is a diagram illustrating another example embodiment of a wireless communication system configured in accordance with the invention.

FIG. 5 illustrates a wireless communication system 500, wherein, PDE 116 does not necessarily include a GPS receiver and associated antenna 120. Rather, PDE 116 includes a network interface (not shown) configured to interface PDE 116 with some form of network from which PDE 116 can download GPS satellite information that PDE 116 can use to generate the GPS assist information. For example, the network interface can be configured to interface PDE 116 with the Internet, or World Wide Web, through an internet interface 120. Alternatively, the network interface can be configured to interface PDE 116 with an Intranet via an Intranet interface 118. In general, the network interface can be configured to interface PDE 116 with any type of WAN, LAN, or a Metropolitan Area Network (MAN), from which PDE 116 can download GPS satellite information.

Equipping PDE 116 with such a network interface can enable PDE 116, in certain situations, to download the GPS satellite information, i.e., Almanac and ephemeris, at faster data rates than PDE 116 can download the information from GPS satellites 104. In certain embodiments, the network interface can serve as a back up means for obtaining the GPS satellite information. In such situations, PDE 116 can still include a GPS receiver and associated antenna 120 for also receiving GPS satellite information from the GPS satellite 104. In certain other embodiments, PDE 116 can include a GPS receiver as a back up to PDE's 116 ability to obtain the GPS satellite information through the network interface. In fact, a conventional PDE needs to derive its timing from the GPS satellites. Therefore, a GPS receiver is required.

PDE 116 also includes a switching center interface configured to interface PDE 116 with switching center 114 so that PDE 116 can forward GPS assist information to communication devices 102 via switching center 114.

Figure 6:
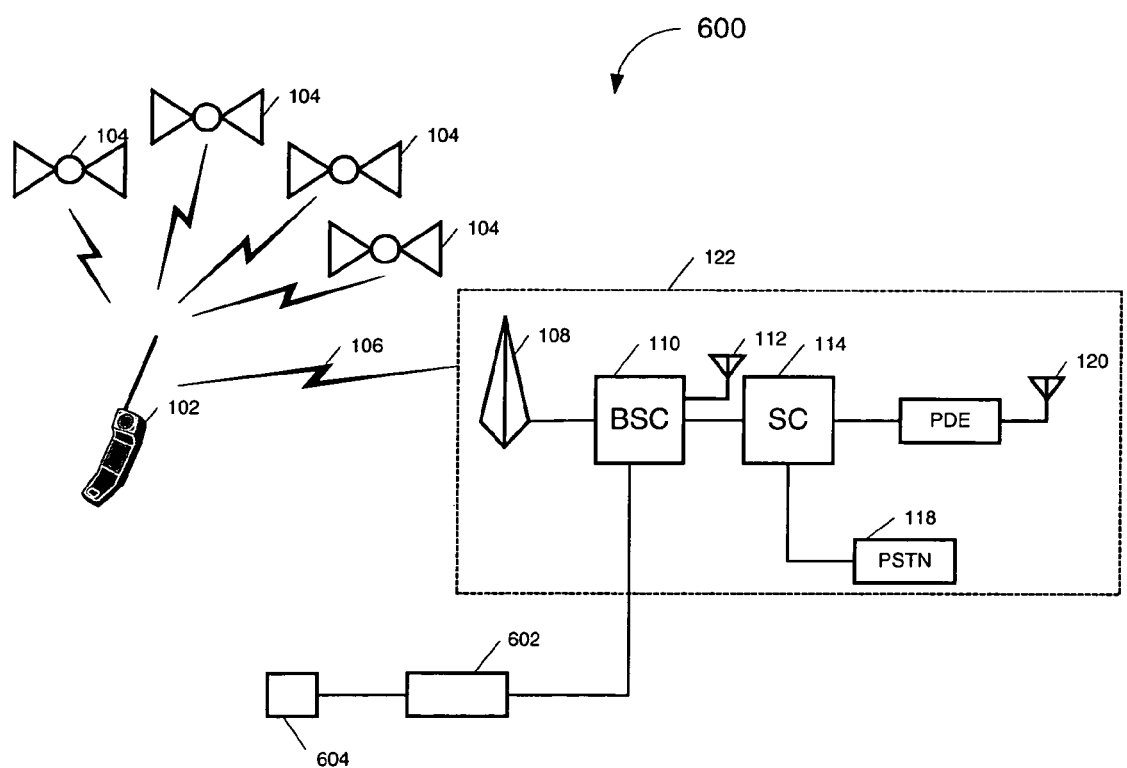
FIG. 6 is a diagram illustrating still another example embodiment of a wireless communication system configure din accordance with the invention.

Even though PDE 116 can be configured to download GPS satellite information at fast download speeds through a network interface such as that described above, requiring PDE 116 to provide communication device 102 with GPS assist information can result in an increased demand on PDE 116 that can render PDE 116 unavailable in times of an emergency. Thus, it can be preferable to use PDE 116 in emergency situations only. FIG. 6 illustrates a wireless communication system 600 that comprises a location assist system 602 in accordance with one embodiment of the systems and methods described herein. In the example embodiment of FIG. 6, location assist system 602 can be used to off load position assistance functionality from PDE 116. In system 600, therefore, PDE 116 can be used for emergency GPS assistance only, or as a back up to location assistance system 602, depending on the embodiment. It should be noted that PDE 116 can include a GPS receiver and associated antenna 120 and/or it can include a network interface such as that described above.

In one embodiment, a location assistance system 602 can be located at each BSC 110. Alternatively, several BSC's 110 can share a single location assistance system 602. Location assistance system 602 can comprise software components, hardware components, or a combination of the two, configured to allow location assistance system 602 to perform the functions described herein. Further, location assistance system 602 can be a stand alone system or it can be incorporated, in whole or in part, into BSC 110 and/or into SC 114, depending on the embodiment. A more detailed description of a location assistance system 602 is provided in relation to FIG. 7.

Location assistance system 602 can be configured to interface through network interface 604 with a network from which location assistance system 602 can download GPS satellite information in a manner similar to that described for PDE 116 in system 500. Thus, for example, location assistance system 602 can be configured to interface with the Internet, and Intranet, the World Wide Web, or any WAN, LAN, or MAN. Once interfaced with a network via network interface 604, location assistance system 602 can be configured to access http servers, file transfer protocol (FTP) servers or other types of file servers on the network, from which location assistance system 602 can download GPS satellite information such as Almanac and ephemeris data.

Location assistance system 602 can comprise a GPS processor capable of generating GPS assistance information from the GPS satellite information downloaded via network interface 604. In an alternative embodiment, location assistance system 602 can be configured to forward downloaded GPS satellite information to BSC 110, which can be configured to generate GPS assistance information from the GPS satellite information forwarded from location assistance system 602. Location assistance system 602 can also be configured to download AA or SA data over network interface 604. Alternatively location assistance system 602, or BSC 110, can be configured to generate the AA or SA information from the downloaded GPS satellite information.

Thus, location assistance system 602 can be configured to generate the GPS assistance information required by the various types of communication devices 102 within wireless communication system 600. Location assistance system 602 can be configured to generate the GPS assistance information, e.g., AA and SA information, that is applicable for the region covered by BSC 110 for a particular time. Location assistance system 602 can be configured to provide content required for GPS assistance messages transmitted by BSC 110 over channel 106, or location assistance system 602 can be configured to construct the entire GPS assistance message depending on the embodiment. But whether BSC 110 or location assistance system 602 generates the GPS assistance message, it can be preferable to break the GPS assistance message into multiple parts. This can be preferable, because of the length of the GPS assistance message or because of the type of the GPS assistance message. For example, it may be necessary to divide Almanac and ephemeris data into multiple messages due to the size of such data.

If network portion 122 is configured to operate in compliance with the IS-2000 specification, then it is preferable that the GPS assistance message be sent as a data burst message containing a payload that is compliant with the IS-801 standard. In this situation, a data burst message can be broadcast on the Forward Broadcast Control Channel. When the data burst message is ready, BSC 110 can be configured to set a broadcast indicator to alert communication devices 102 in communication with BSC 110 that they need to wake up and monitor their assigned broadcast slot on the Forward Common Control Channel. The data burst message can then either reside in the assigned broadcast slot or a given communication device 102 can be instructed to monitor the Forward Broadcast Control Channel for the data burst message. It will be understood however, that if a Quick Paging Channel and/or Forward Common Control Channel are not supported by network portion 122, then the above procedure would vary accordingly.

BSC 110 can be configured to repeat the above process at fixed interval so that it can download any GPS assist information required to ensure that communication devices 102 have accurate, up to date GPS assist information available to them. Thus regardless of whether the GPS assist information is generated by a location assistance system 602, a PDE 116, or BSC 110, BSC 110 can be configured to ensure that devices 102 have updated GPS assist information at all times.

Figure 7:
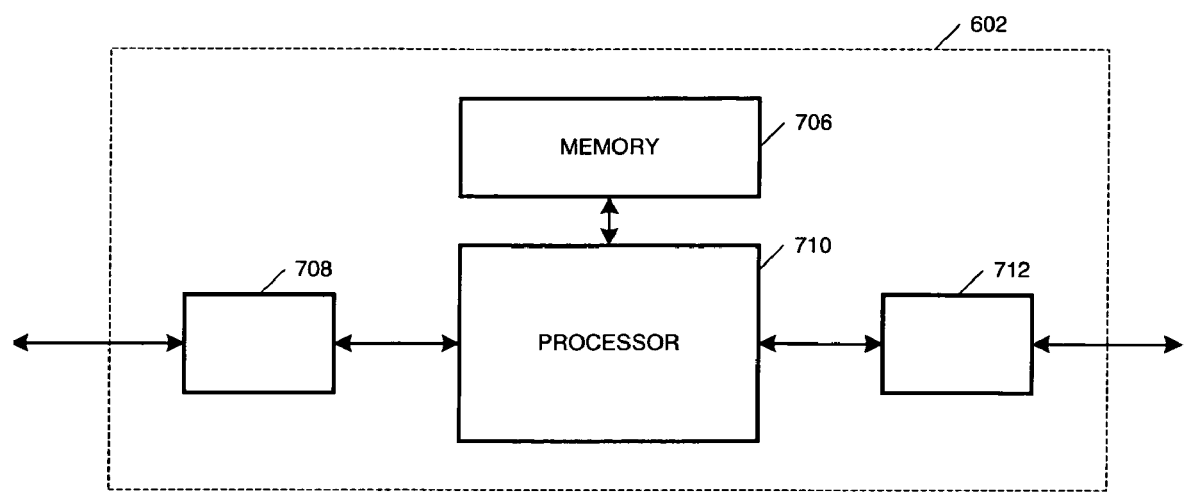
FIG. 7 is a diagram illustrating an example embodiment of a location assistance system that can be included in the wireless communication system of FIG. 6 in accordance with one embodiment of the invention.

FIG. 7 is a diagram illustrating an example location assistance system 602 configured in accordance with the systems and methods described herein. Thus, location assistance system 602 can comprise a network interface 708 configured to interface location assistance system 602 with a network through which GPS satellite information can be downloaded. For example, network interface 708 can be configured to interface location assistance system 602 with the Internet, or World Wide Web, an Intranet, or some other WAN, LAN, or MAN. In one particular embodiment, location assistance system can use network interface 708 to access a web site from which the GPS satellite information can be downloaded. Because the download rates through network interface 708 can be relative fast, location assistance system 602 can often download GPS satellite information through network interface 708 at much faster rates than the same information can be downloaded from a GPS satellite.

In the example embodiment of FIG. 7, location assistance system 602 can be configured to process the downloaded GPS satellite information in order to generate GPS assist information. Thus, location assistance system 602 can comprise the hardware and/or software needed to process the downloaded GPS satellite information. To this end, location assistance system 602 is illustrated as including a processor 710 and memory 706. In certain embodiments, memory 602 can be configured to store instructions used by processor 710 to process the downloaded GPS satellite information.

Processor 710 can comprise one or more processors, such as microprocessors, micro controllers, Digital Signal Processors (DSPs), coprocessors, etc., as required. Memory 706 can comprise any type of memory device or module that can store the required instructions, such as Read Only Memory (RAM), Random Access Memory (ROM), or the equivalent. Memory 706 can also, in certain embodiments, be configured to store the downloaded GPS information and/or the GPS assist information generated therefrom.

Location assistance system 602 can also include a wireless communication system interface 712 configured to interface location assistance system 602 with network portion 122 of a wireless communication system. The GPS assistance information, or possibly the GPS satellite information, can then be forwarded to network portion 122 through wireless communication system interface 712. As mentioned above, the information can be formatted so that it can be forwarded to a communication device 102 without further processing. Alternatively, the information forwarded to network portion 122 can require further formatting, e.g., message formatting.

Again, it should be noted that depending on the embodiment, some or all of the components illustrated in FIG. 7 can be incorporated into network portion 122. Thus, for example, processor 710, or some portion thereof, can comprise processing circuits, or devices, that are part of BSC 110 or switching center 114. Similarly, memory 706 can comprise memory, circuits or device already included in network portion 122.

Again, it will be understood that the systems and methods described herein are as applicable to Wireless Wide Area Networks (W-WANs) as they are to Wireless Local Area Networks (W-LANs), and Wireless Personal Area Networks (W-PANs) and Wireless Metropolitan Area Networks (W-MANS). Further, the systems and methods described herein are applicable regardless of whether system 100 is primarily used for data communication, voice communication, or both. And, while embodiments and implementations of the invention have been shown and described, it should be apparent that many more embodiments and implementations are within the scope of the invention. Accordingly, the invention is not to be restricted, except in light of the claims and their equivalents.

What is claimed is:

1. A base station, comprising:
a receiver configured to receive GPS satellite signals from a plurality of GPS satellites, the GPS satellite signals comprising GPS Almanac information;
a processor configured to track locations of the plurality of GPS satellites using the GPS Almanac information and generate GPS assist information based on the GPS satellite signals, the GPS assist information comprising at least a portion of the GPS satellite information and at least one of sensitivity assist (SA) information and acquisition assist (AA) information; and
a transmitter configured to simultaneously transmit the GPS assist information to a plurality of GPS enabled devices;
wherein the base station is configured to receive a registration request from at least one of the plurality of GPS enabled devices, and to transmit the GPS assist information to at least one of the plurality of GPS enabled devices in response to the received registration request.

2. A base station, comprising:
a receiver configured to receive GPS satellite signals from a plurality of GPS satellites, the GPS satellite signals comprising GPS Almanac information;
a processor configured to track locations of the plurality of GPS satellites using the GPS Almanac information and generate GPS assist information based on the GPS satellite signals, the GPS assist information comprising at least a portion of the GPS satellite information and at least one of sensitivity assist (SA) information and acguisition assist (AA) information; and
a transmitter configured to simultaneously transmit the GPS assist information to a plurality of GPS enabled devices;
wherein the transmitter is configured to transmit the GPS assist information in the GPS frequency band.

* * * * *